United States Patent [19]

Rydborn

[11] 4,086,575
[45] Apr. 25, 1978

[54] APPARATUS FOR THE OPTIONAL DETECTION OF THE MOVEMENT OF ANY INDIVIDUAL OR ANY OPTIONAL PAIR OF OBJECTS

[76] Inventor: Sten-Åke Rydborn, Olaus Kloxhultsvagen 21, Almhult, Sweden

[21] Appl. No.: 623,200

[22] Filed: Oct. 16, 1975

[30] Foreign Application Priority Data

Dec. 2, 1974  Sweden .................................. 7415050

[51] Int. Cl.² ...................... B65H 63/00; G08B 21/00
[52] U.S. Cl. ................................. 340/259; 139/370.1; 66/163; 57/81; 28/187
[58] Field of Search ........................... 340/259, 267 R; 139/370, 353; 66/163; 57/81; 28/51

[56] References Cited
U.S. PATENT DOCUMENTS

| | | | |
|---|---|---|---|
| 3,656,139 | 4/1972 | Wuntruss | 340/267 R |
| 3,725,889 | 4/1973 | Glosek | 340/259 |
| 3,922,661 | 11/1975 | Enabnit et al. | 340/259 |

Primary Examiner—Donald J. Yusko
Assistant Examiner—Joseph E. Nowicki
Attorney, Agent, or Firm—Beveridge, De Grandi, Kline & Lunsford

[57] ABSTRACT

Apparatus for detecting whether one thread selected from a number of threads is in motion, while no other thread is in motion, or whether a set of threads selected from a number of sets, each having two or more threads, is in motion, while no other set is in motion. The apparatus includes a signal generator associated with each thread for generating an electric signal in response to the movement of the associated thread. The signal generators are coupled sequentially to signal indication apparatus. If the prescribed thread movement is detected, the signal generating apparatus inhibits generation of an alarm indication. If the prescribed thread movement is not detected, the signal generating apparatus activates a trigger device to initiate an alarm.

12 Claims, 4 Drawing Figures

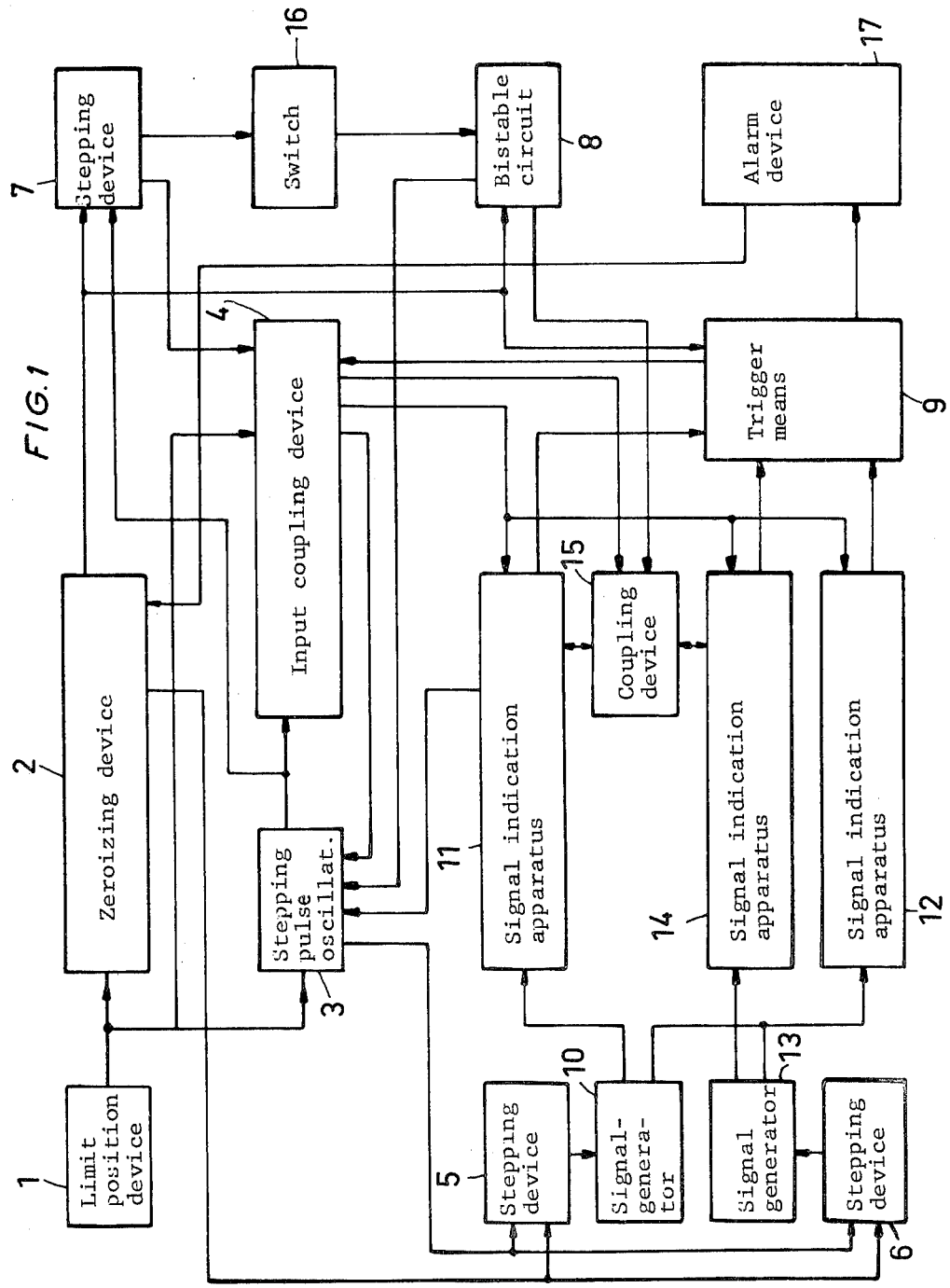

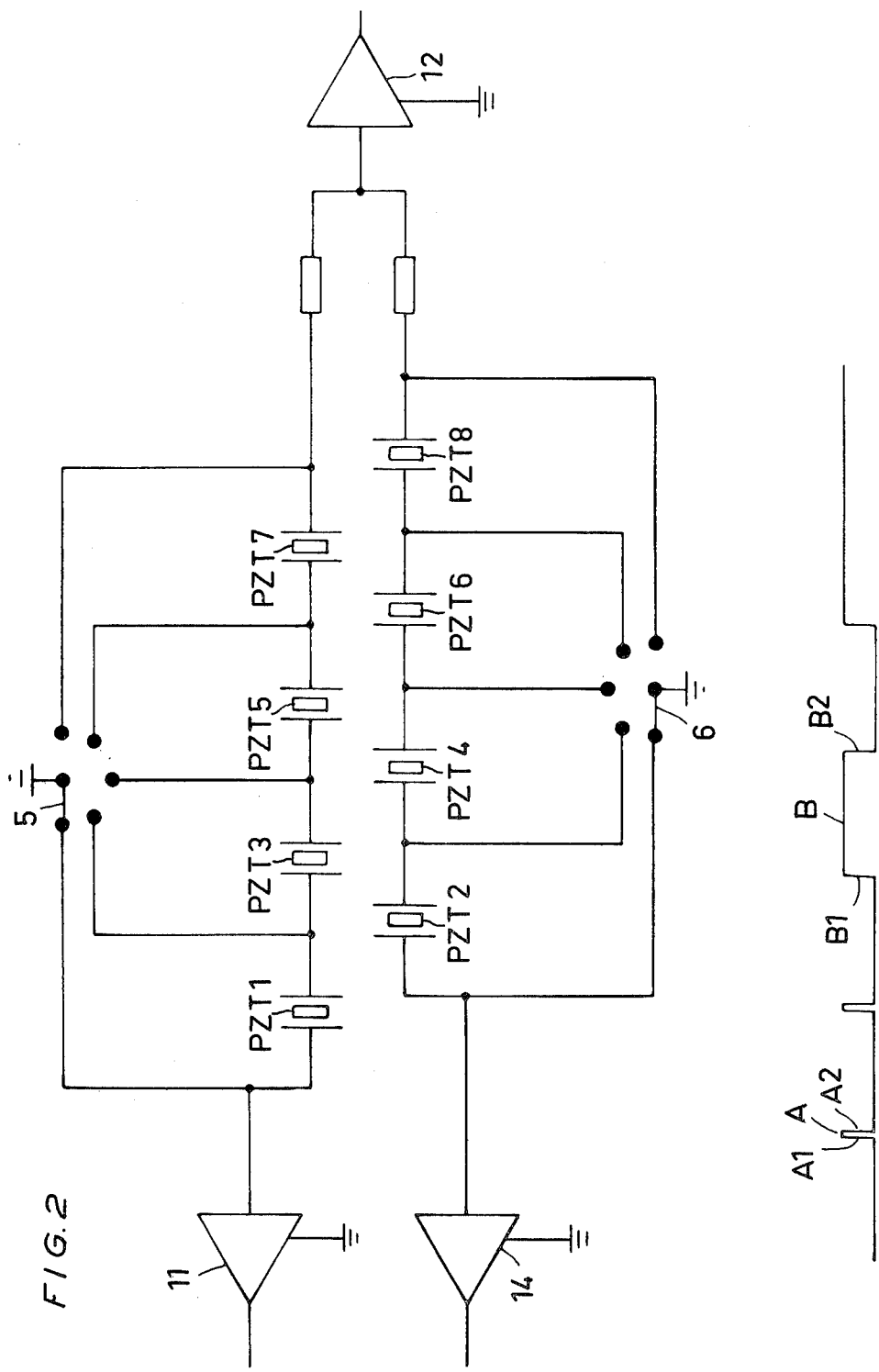

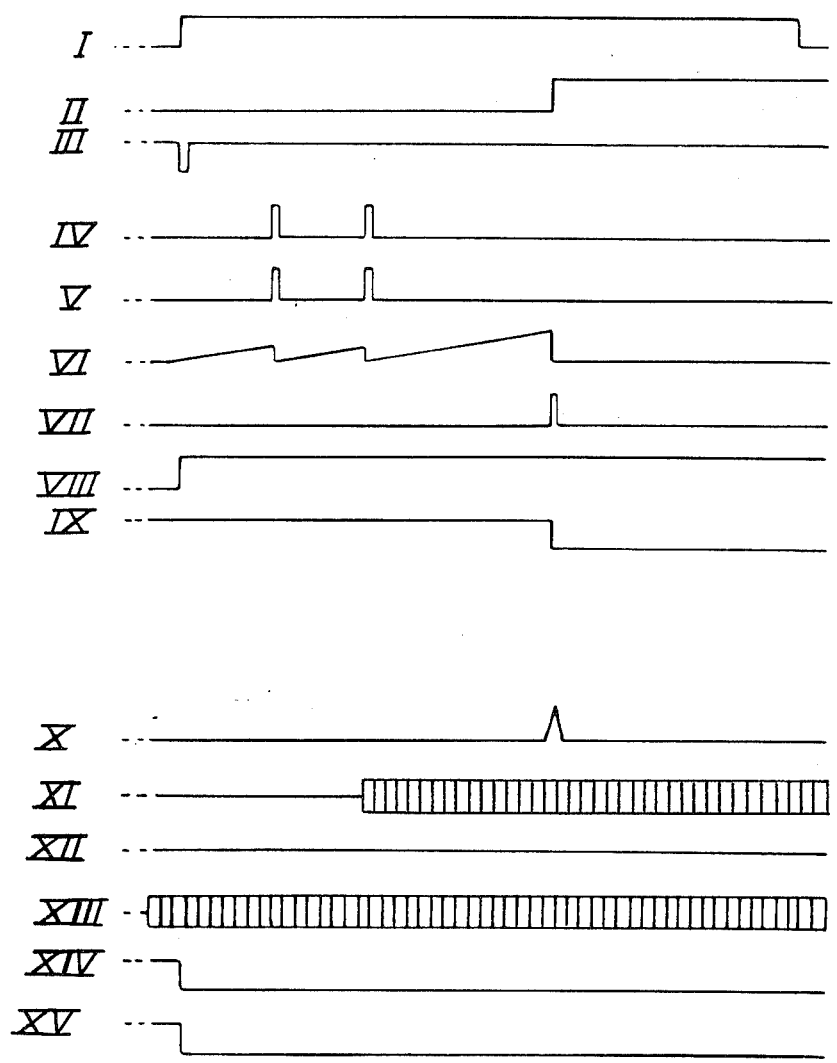

APPARATUS FOR THE OPTIONAL DETECTION OF THE MOVEMENT OF ANY INDIVIDUAL OR ANY OPTIONAL PAIR OF OBJECTS

The present invention relates to an apparatus for detecting whether one object selected from a number of objects, for example a thread, strip or the like, and no other object, is in motion or whether a set selected from a number of sets having two or more such objects, and no other set, is in motion, the apparatus comprising means associated with each object and generating an electric signal in response to the movement of the object.

It is often desirable, within many industrial fields, to be able to detect not only the presence but also the movement of objects, for example, threads, strips etc. Moreover, in recent years it has become a more general desire to be able to detect the movement of objects in pairs and to simultaneously detect that no more than a selected pair of objects is in motion at the same time, or to detect the movement of a single object and to simultaneously detect that no more than one object is in motion. Furthermore, it should be possible to effect this detection by means of an apparatus which is as simple and reliable as possible.

In one prior art apparatus for detecting the movement of an object there is disposed a plurality of devices, arranged side-by-side, for converting the movement of the object into an electric signal, for example, ceramic eyes cooperating with a piezoelectric crystal. Thus, as indicated above, it is desirable to be able to detect the movement of a selected pair of objects and to detect that no other object than the selected pair is in motion. It should also be possible, after a simple adjustment, for example, by a switch, to detect the movement of only a single object and to detect that no other object is in motion. Furthermore, it should be possible by means of the switch to select the number of pairs of signal-generators within which will occur the pair of objects to be detected.

According to the invention, the signal-generating means associated with each of the objects forming the set are each coupled to an output from its respective stepping device to be coupled each to its first signal indication apparatus. Moreover, all of the remaining signal generating means are coupled to a further signal indication apparatus and a coupling device is provided between the first signal indication apparatuses for coupling thereof to one signal indication apparatus, when only a single object is to be detected.

The invention will be described in greater detail hereinbelow and with reference to the accompanying drawings in which;

FIG. 1 is a block diagram of an embodiment of an apparatus according to the present invention;

FIG. 2 is a simplified block diagram of a part of the apparatus according to FIG. 1;

FIGS. 3A and 3B are diagrams of pulses from different points in the apparatus in different operational states.

Figure 3A:
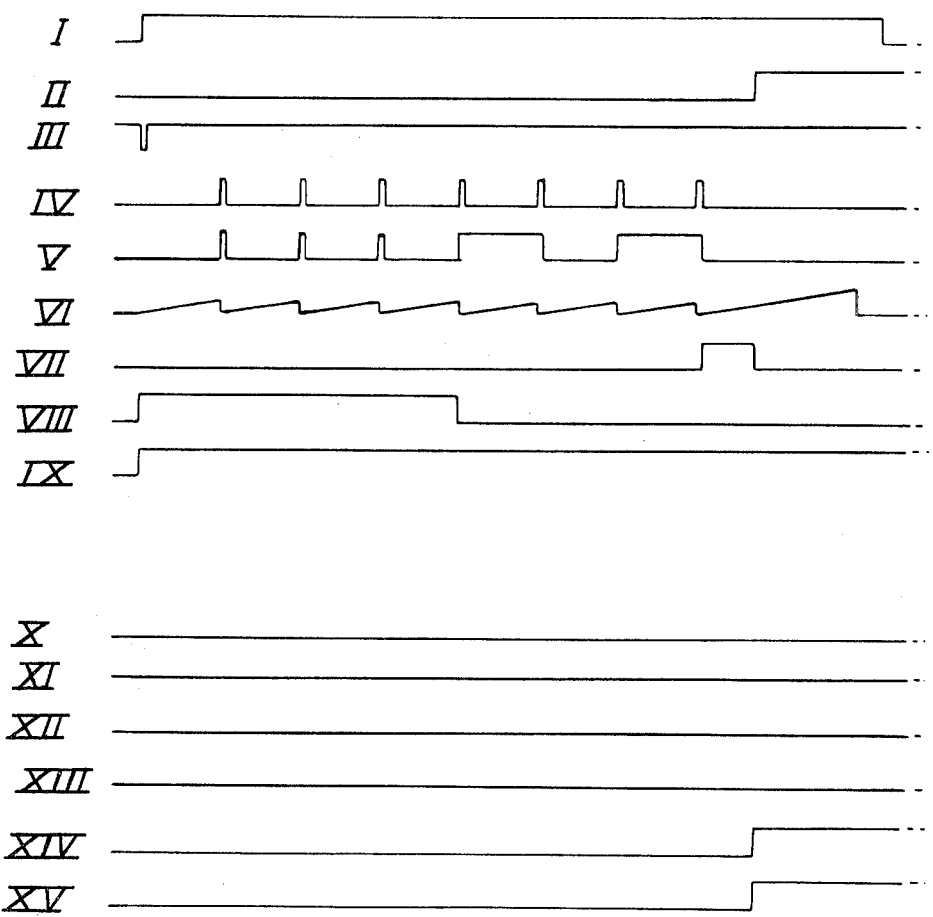

The embodiment of the present invention shown on the drawings and described in the following is intended for use in, for example, a gripper loom with grippers operating from both sides of the fabric, one of the grippers moving the weft to approximately the middle of the fabric where the second gripper picks up the weft and draws it to the other edge of the fabric. Naturally, the present invention should not be considered as restricted to use in such looms or other looms, neither should it be restricted to the detection of thread movement, but may be used in any type of machine which works with threads, strips or the like.

The detection period during which the apparatus is to be in operation is determined by means of an apparatus 1, depicted in FIG. 1, which defines the beginning and end of the detecting period, the apparatus being in the form of, for example, a light limit position of per se known type, according to which a flag mounted onto a shaft coupled to the driving shaft of the loom breaks a light beam illuminating a phototransistor, at the beginning of the detecting period and allows the light beam to pass after the passage of the trailing edge of the flag. Thus, the arc length of the flag determines the detecting period. The output of the light limit position apparatus is coupled to a zeroizing device 2, a device 3 for generating stepping pulses and an input coupling device 4. The zeroizing device 2 is in turn coupled to a first stepping device 5, a second stepping device 6, a third stepping device 7, a bistable circuit 8 and a trigger means 9. The device 3 for generating stepping pulses is coupled to the stepping devices 5, 6 and 7 and to the input coupling device 4, having feed-back to the device 3. The stepping device 5 is coupled to a block 10 having, in the present case, four series-connected signal generators PZT1, PZT3, PZT5, PZT7 which are shown in FIG. 2 and each of which is a piezoelectric signal generator of the above-mentioned type which generates an electric signal in response to detection of motion of an associated thread. One connection to the series of signal generators is coupled to a signal indication apparatus 11 and the other connection to the series of signal generators is coupled to a further signal indication apparatus 12. The second stepping device 6 is coupled to a block 13 having, in the present case, four signal generators PZT2, PZT4, PZT6, PZT8 (FIG. 2), coupled in series, and also consisting of the above-described motion-detecting piezoelectric signal generators, one connection to the series of signal generators being connected to yet another signal indication apparatus 14, whereas the other connection to the series of signal generators is coupled to the same signal indication apparatus 12 as the second connection to the series of signal generators in block 10. A coupling device 15 is coupled in between the two signal indication apparatuses 11 and 14. The signal indication apparatus 11 is directly coupled to the device 3 for generating stepping pulses, while the signal indication apparatus 14 is coupled to the device 3 by the intermediary of the coupling device 15 and the signal indication apparatus 11. The three signal indication apparatuses 11, 12 and 14 are coupled to the input coupling device 4 and to a trigger means 9. Furthermore, the coupling device 15 is coupled to the input coupling device 4 and to the bistable circuit 8 which in turn is coupled to the third stepping device 7 by the intermediary of a switch 16. The bistable circuit 8 is, furthermore, coupled to the device 3 for generating stepping pulses. The trigger means 9 is coupled to an alarm device 17 which, in the present embodiment, serves to stop the loom if a signal from the trigger means 9 is received. The alarm device 17 is coupled to the zeroizing device 2 and the trigger means 9 is coupled to the input coupling device 4.

The arrangement of the signal generators PZT1–PZT8 will be described in greater detail in conjunction with FIG. 2 before the description of the operational method of the apparatus according to the present invention. In FIG. 2, the stepping devices 5 and 6 are shown as a simple switching arm which may be switched for connection of the signal generators to the signal indication apparatuses 11 and 14 after each other, it being obvious that the signal generators which are not connected to the signal indication apparatuses 11 and 14 will be connected to the signal indication apparatus 12. It is assumed, in this context, that the signal indication apparatuses 11, 12 and 14 are earthed as are the switching arms 5 and 6. In the practical embodiment, the stepping devices 5 and 6 consist of binary counters of the SN74142 type from Texas Instruments, these counters being stepped by means of suitable stepping pulses from the device 3. FIG. 2 also shows examples of stepping pulses for stepping the counters or switching the switching arms 5 and 6. When the device 3 emits a stepping pulse A to the stepping devices 5 and 6 the leading edge A1 will switch the switching arm 5 one step anticlockwise and the trailing edge A2 will switch the switching arm 6 one step clockwise. Because of the short distance between the leading edge A1 and the trailing edge A2, the signal generators PZT1 and PZT2 will be coupled to the signal indication apparatuses 11 and 14 almost simultaneously, whereas the remaining signal generators PZT3-PZT8 will be connected to the signal indication apparatus 12. If the stepping pulse B occurs instead of the stepping pulse A, its leading edge B1 will couple in the signal generator PZT1, while the remaining signal generators PZT2-PZT8 will be coupled to the signal indication apparatus 12. After that period of time which corresponds to the pulse width or to the distance between the leading edge B1 and the trailing edge B2, the signal generator PZT2 will be coupled to the signal indication apparatus 14, whereas the remaining signal generators PZT3-PZT8 will be coupled to the signal indication apparatus 12. In the one state of the bistable circuit 8, in which the switch 16 is in one of the positions 1-4, the device 3 will generate stepping pulses of the type A; and in the other state of the circuit 8, in which the switch 16 is in the position 0 or the stepping device 7 has been advanced passed the adjusted switching position corresponding to the step, the device 3 will generate stepping pulses of the type B.

The in principle operational method of the apparatus described above will now be clarified with reference to the block diagram in FIG. 1. Once the leading edge of the flag disposed in the light limit position apparatus 1 has broken the light beam, the apparatus 1 will emit a signal to the apparatuses coupled thereto, which entails that a weft has been commenced. If the switch 16 (which, in the present case, is adjustable in five positions viz: a zero position, in which the weft comprises a single thread in any one of the signal generators; and positions 1-4 in which the weft comprises two threads in the signal generator pairs PZT1-PZT2, PZT3-PZT4, PZT5-PZT6 and PZT7-PZT8 respectively) is in the zero position, only a single one of the signal generators will emit a signal. At the occurrence of the signal from the apparatus 1, a clock pulse oscillator in the device 3 begins to generate clock pulses which are fed to the stepping device 7 and to the input coupling device 4 and give rise to a stepping pulse B from the device 3 which is fed to the stepping devices 5 and 6. It should be observed, in this context, that the signal from the light limit position apparatus 1 to the zeroizing device 2 causes the zeroizing device to zeroize the various devices 5-9 coupled to it. The leading edge B1 of the pulse B will thus cause the stepping device 5 to couple the signal generator PZT1 to the signal indication apparatus 11. The trailing edge B2 will then advance the stepping device 6 so that this couples the signal generator PZT2 to the signal indication apparatus 14. If the thread in the weft occurs in the signal generator PZT5 a signal will occur in the signal indication apparatus 11 after the arrival of the leading edge B1 of the third stepping pulse from the device 3. This signal goes to the device 3 whereby the state of the device is fixed, in which state the leading edge B1 has advanced the stepping device 5 to the position in which the signal generator PZT5 is coupled to the signal indication apparatus 11. Furthermore, an interruption will occur of the supply of clock pulses to the input coupling device 4 which couples the signal indication apparatuses 11, 12 and 14 to the trigger means 9. Since, as was indicated above, the switch 16 is in position 0, the bistable circuit 8 will be in its single-thread position, in which state it controls the device 3 to emit pulses of the B type and cause the coupling device 15 to couple the signal indication apparatuses 11 and 14, such that the signal in the signal indication apparatus 11 will serve as a signal from both the signal indication apparatus 11 and the signal indication apparatus 14. As a result the trigger means is prevented from triggering the alarm device 17, provided that no signal occurs in the signal indication apparatus 12. The detection period initiated by means of the input coupling device once the signal generator which emitted the signal has been found, is terminated by means of the trailing edge of the flag in the light limit position apparatus.

If the signal from the signal generator PZT5 disappears during the period when the signal indication apparatuses 11, 12 and 14 are coupled to the trigger means 9, or if a signal occurs in the signal indication apparatus 12, the trigger means 9 will trigger the alarm device so that the loom stops.

If, on the other hand, it is desired to detect a weft with two threads which is to actuate the signal generators PZT5 and PZT6, the switch 16 is adjusted in position 3, whereby the bistable circuit 8 will be switched to a state in which the device 3 is caused to generate pulse of the A type and the coupling device 15 is caused to separate the signal indication apparatuses 11 and 14 from each other when the input coupling device 4 couples the signal indication apparatuses 11, 12 and 14 to the trigger means 9. The signal from the apparatus 1 thus brings about first and foremost a zeroization by means of the zeroizing device 2 and a generation of clock pulses in the device 3, and energizes the input coupling device 4. Because of the adjustment of the switch 16 in position 3, it is not necessary that the threads be in the signal generators PZT5 and PZT6, but the thread pair can instead appear in any of the preceding signal generator pairs whatever. Simultaneously with the advancement pulse to the stepping device 5 and 6, an essentially identical stepping pulse or clock pulse is fed to the stepping device 7. After the two first stepping pulses A, the leading edge A1 of the third stepping pulse will couple the signal generator PZT5 to the signal indication apparatus 11, the signal indication apparatus then emitting a signal to the device 3 which as previously is fixed in its state. However, in view of the fact that the distance between the leading edge A1 and the trailing edge A2 is so short, the signal generator PZT6 is also coupled to its signal indication apparatus 14. At the same time, the stepping device 7 is advanced three steps. Here, it should be observed that the stepping device 7 is advanced one step for each complete stepping pulse. Because the bistable circuit 8 is in position for a double thread, it will, once the input coupling device 4 has coupled the signal indication apparatuses 11, 12 and 14 to the trigger means 9, switch the coupling device 15 to that position in which the signal indication apparatuses 11 and 14 are separated from each other. In this instance a signal must occur both in the signal indication apparatus 11 and in the signal indication apparatus 14, but no signal in the signal indication apparatus 12 in order to prevent the trigger means 9 from triggering the alarm device 17. If the thread pair had appeared in the signal generators PZT3 and PZT4 the function would have been exactly the same with the exception that the input coupling device 4 would have connected the signal indication apparatuses 11, 12 and 14 to the trigger means 9 at an earlier point in time. If no thread movement occurs, the clock pulse oscillator will not be prevented from generating clock pulses, and thereby stepping pulses, as a result of which the stepping device 7 will count up to a state in which it causes the input coupling device 4 to couple the signal indication apparatuses 11, 12 and 14 to the trigger means 9, thereby triggering the alarm device 17.

Thus, the principle, the operational method of the apparatus according to the present invention is that it is first necessary to find a thread or a signal generator which emits a signal, whereupon the signal indication apparatuses are coupled to the trigger means 9 and control is effected if the conditions initially selected are satisfied. If the switch 16 is adjusted in position 3 and a signal occurs in signal generator PZT3, but no signal in signal generator PZT4 a signal will be absent from the signal indication apparatus 14 after the coupling in of the signal indication apparatus and after the separation of the two signal indication apparatuses 11 and 14 from each other. Consequently, the trigger means 9 will trigger the alarm device 17. If, on the other hand, signals are received from PZT3 and PZT4 and also from PZT7 the trigger means 9 will trigger the alarm device 17, since it receives signals from the signal indication apparatus 12.

In FIG. 3A and 3B there are shown signals from different points I-XV in the apparatus according to FIG. 1. Point I is the output from the light limit position apparatus 1, point II is the input to the alarm device 17 which causes the relay to fall as soon as the signal flank appears, point III is the output from the zeroizing device 2, point IV is the output from the clock pulse oscillator in the device 3, point V is the output from the device 3, point VI is within the input coupling device 4, point VII is the output from the input coupling device 4, point VIII is the output from the bistable circuit 8, point IX is the output from the coupling device 15, point X is the output from the signal indication apparatus 12, point XI is the input to the signal indication apparatus 11, point XII is the input to the signal indication apparatus 14, point XIII is the input to the signal indication apparatus 12, point XIV is the output from the signal indication apparatus 11, point XV is the output from the signal indication apparatus 14. FIG. 3A shows a state with the switch 16 in its position 3, but no signal is generated in any of the signal generators PZT1-8 and FIG. 3B shows a state with the switch in the same position with signals from PZT3 and PZT5 but no signal from PZT4. In both cases, the alarm device 17 will cause the loom to stop.

The present invention also makes possible an arrangement by means of which one and the same number of signal emitters can be utilized for the detection not only of two threads in a weft but also if one weft includes, for example, four threads, another three threads, a third two threads and a fourth one thread. Here, a control is effected as to whether the weft includes more or fewer threads and if the thread or threads in the weft appear among a selected number of signal emitters. This can be realised by means of a switch and a circuit constructed in relation to the described electronic circuit and operating according to the same principle. In order to be able to detect a weft having four threads, for example four signal generator sets PZT1, 3, 5, 7 will be required which are each coupled to its respective signal indication apparatus, it being possible that the four threads appear in any one of the four sets. This number is selected by means of a switch. The same is valid for the remaining wefts.

In such a case the emitter unit can consist of four emitter units having, for example, six signal generators PZT in each unit, three switches and four signal indication circuits, such that the arrangement can be considered as square with four signal indication apparatuses and four signal generators in each channel. In this case, the switch for a four-thread weft can be adjusted to position 2, whereby either all of the first or all of the second signal generators in each channel, and no other generators shall provide a signal simultaneously since the signal indication apparatuses are separated from each other by means of the coupling device. In such a case, the switch for a three-thread weft can be adjusted in position 3, in which event signals shall occur from only three of the third signal generators and no other, while the switch for a two-thread weft can be adjusted to position 5 in which case only two and two of the fourth and fifth signal generators, respectively, shall emit signals.

The apparatus according to the present invention may be modified in a number of ways without departing from the spirit and scope of the appended claims and the above description should not, therefore, be considered as limitative of the scope of the invention.

What I claim is:

1. Apparatus for detecting whether one object selected from a number of objects is in motion, while no other object of said number of objects is in motion, or whether a set of objects selected from a number of sets of objects, each having two or more objects, is in motion, while no other set is in motion, said apparatus comprising:

a plurality of signal generating means, one signal generating means uniquely associated with each object to be detected, each signal generating means generating an electric signal in response to detection of movement of its associated object, said plurality of signal generating means being grouped in a plurality of groups, each group including a plurality of signal generating means;

a plurality of stepping means, one stepping means uniquely associated with each group of signal generating means, each stepping means capable of being stepped through a plurality of positions in each of which the stepping means is electrically connected to a unique one of the signal generating means in the associated group;

means for stepping said plurality of stepping means through the plurality of positions;

a plurality of indicating means, one indicating means uniquely coupled to each of said groups of signal generating means; and a further indicating means coupled to every group of signal generating means;

each stepping means including means electrically connecting the signal generating means of the position to which the stepping means is stepped to the associated one of said plurality of indicating means, for indicating generation of an electric signal by the signal generating means upon detection of movement of its associated object, and electrically connecting other signal generating means in the associated group to said further indicating means, for indicating generation of an electric signal by one of said other signal generating means upon detection of movement of the associated object.

2. Apparatus as claimed in claim 1 further including means for coupling said plurality of indicating means together when only a single object is to be detected.

3. Apparatus as claimed in claim 1 in which said means for stepping said stepping means steps each of said stepping means substantially simultaneously.

4. Apparatus as claimed in claim 1 in which said means for stepping said stepping means is coupled to said plurality of indicating means to prevent stepping of said stepping means upon indication of the generation of an electric signal.

5. Apparatus as claimed in claim 1 further comprising means for inhibiting indication of an electric signal by said plurality of indicating means for a predetermined period of time after said stepping means are stepped.

6. Apparatus as claimed in claim 2 further comprising a further stepping means, a bistable device connected to said coupling means and to said means for stepping said stepping means, and switch means connected to said further stepping means for advancement thereof a predetermined number of steps and thereafter switching said bistable device to one of its stable states to cause said coupling means to couple said plurality of indicating means together and to extend the stepping pulses to a length essentially corresponding to the gap between two stepping pulses.

7. Apparatus as claimed in claim 6 in which said further stepping means is responsive to cessation of stepping of said further stepping means before said further stepping means has reached a position corresponding to the position of said switch means, to switch said bistable device to the other of its stable states to cause said coupling means to electrically decouple said plurality of indicating means.

8. Apparatus as claimed in claim 1 further comprising signal means coupled to said plurality of indicating means and to said further indicating means for generating an alarm signal upon occurrence of either (1) indication by at least one but not all of said plurality of indicating means of generation of an electric signal, or (2) indication by said further indicating means of generation of an electric signal.

9. Apparatus as claimed in claim 1 further comprising means for setting said stepping means to a preset zero position before said means for stepping said stepping means steps said stepping means through the plurality of positions.

10. Apparatus as claimed in claim 6 further comprising means for setting said stepping means to a preset zero position and said bistable means to one of its stable states before said means for stepping said stepping means steps said stepping means through the plurality of positions.

11. Apparatus as claimed in claim 8 further comprising means for terminating any alarm condition and for setting said stepping means to a preset zero position and said bistable means to one of its stable states before said means for stepping said stepping means steps said stepping means through the plurality of positions.

12. Apparatus as claimed in claim 11 in which said signal means includes means for inhibiting said terminating and setting means upon generation of an alarm signal.

* * * * *